(12) United States Patent
Darby

(10) Patent No.: US 12,006,977 B2
(45) Date of Patent: Jun. 11, 2024

(54) THRUST BEARING SEAL FOR THIN WING MULTI SLICE RGA

(71) Applicant: Goodrich Actuation Systems Limited, Solihull (GB)

(72) Inventor: Jonathan Darby, Staffordshire (GB)

(73) Assignee: GOODRICH ACTUATION SYSTEMS LIMITED, West Midlands (GB)

(*) Notice: Subject to any disclaimer, the term of this patent is extended or adjusted under 35 U.S.C. 154(b) by 149 days.

(21) Appl. No.: 17/592,914

(22) Filed: Feb. 4, 2022

(65) Prior Publication Data
US 2022/0252108 A1    Aug. 11, 2022

(30) Foreign Application Priority Data

Feb. 8, 2021    (EP) .................................. 21275012

(51) Int. Cl.
| F16C 33/74 | (2006.01) |
| F16C 17/04 | (2006.01) |
| F16J 15/3216 | (2016.01) |
| F16J 15/3236 | (2016.01) |

(52) U.S. Cl.
CPC .............. *F16C 33/74* (2013.01); *F16C 17/04* (2013.01); *F16J 15/3216* (2013.01); *F16J 15/3236* (2013.01)

(58) Field of Classification Search
CPC .... F16J 15/3236; F16J 15/3216; F16C 17/04; F16C 33/74
See application file for complete search history.

(56) References Cited

U.S. PATENT DOCUMENTS

| 4,751,855 | A | | 6/1988 | Hudson et al. |
| 4,795,275 | A | * | 1/1989 | Titcomb .................. F16C 33/74 |
| | | | | 277/411 |
| 4,910,987 | A | * | 3/1990 | Woodrow ............ F16J 15/3456 |
| | | | | 277/423 |
| 4,932,613 | A | | 6/1990 | Tiederman et al. |
| 4,979,700 | A | | 12/1990 | Tiedeman et al. |
| 5,490,731 | A | * | 2/1996 | Scharf ..................... F16C 33/74 |
| | | | | 277/572 |
| 5,536,088 | A | | 7/1996 | Cheever et al. |
| 6,123,448 | A | * | 9/2000 | Becker ................. B63H 23/321 |
| | | | | 277/572 |

(Continued)

FOREIGN PATENT DOCUMENTS

| EP | 0174820 A2 | 3/1986 |
| EP | 0174820 A3 | 3/1986 |

(Continued)

OTHER PUBLICATIONS

European Search Report for Application No. 21275012.9, dated Jul. 28, 2021, 7 pages.

*Primary Examiner* — Eugene G Byrd
(74) *Attorney, Agent, or Firm* — CANTOR COLBURN LLP

(57) ABSTRACT

A thrust bearing seal for radially sealing a gap between a first component and a second component. The seal includes an external sealing cap that extends circumferentially around an outer circumferential surface of at least a section of said first component and a projection that extends radially inwardly from said external sealing cap and into said gap.

12 Claims, 3 Drawing Sheets

(56) References Cited

U.S. PATENT DOCUMENTS

| | | | | |
|---|---|---|---|---|
| 6,980,393 B2 * | 12/2005 | Kull | ............... | G11B 17/028 |
| 7,201,700 B2 | 4/2007 | Buxton | | |
| 7,249,363 B2 * | 7/2007 | Noda | ............ | G11B 19/2009 |
| | | | | 720/721 |
| 2011/0103728 A1 * | 5/2011 | Cowles | ............ | F16C 33/76 |
| | | | | 277/351 |
| 2013/0279834 A1 * | 10/2013 | Willaczek | ......... | F16C 33/76 |
| | | | | 384/147 |
| 2019/0002044 A1 * | 1/2019 | Haas | ............ | B22F 5/106 |
| 2021/0071712 A1 * | 3/2021 | Ishii | ............ | B60G 15/068 |

FOREIGN PATENT DOCUMENTS

| | | | |
|---|---|---|---|
| EP | 1469215 | A1 | 10/2004 |
| GB | 2160269 | A | 12/1985 |

\* cited by examiner

THRUST BEARING SEAL FOR THIN WING MULTI SLICE RGA

CROSS-REFERENCE TO RELATED APPLICATIONS

This application claims priority to European Patent Application No. 21275012.9 filed Feb. 8, 2021, the entire contents of which is incorporated herein by reference.

FIELD OF TECHNOLOGY

The examples described herein relate to thrust bearing seals.

BACKGROUND

The wings of an aircraft can contain geared actuators. There is a requirement to fit geared actuators such as a multi-slice rotary geared actuator (RGAs) within a thin wing section. Unfortunately, due to the fact that the wing root at the leading edge of the wing is so thin, it is not possible or difficult to fit such multi-slice RGAs at the leading edge of the wing.

The examples described herein therefore aim to provide improved seals that can be used in such RGAs, so that the resulting RGA may have a have a smaller envelope and can be fitted into the leading edge of an aircraft wing. The thrust bearing seals described herein could also be used in other mechanical equipment and are not limited to use in RGAs or aircraft wings.

SUMMARY

A thrust bearing seal is described herein for radially sealing a gap between a first component and a second component, the seal comprising: an external sealing cap that extends circumferentially around an outer circumferential surface of at least a section of said first component and wherein said sealing component further comprises a projection that extends radially inwardly from said external sealing cap and into said gap.

In some of the examples described herein the external sealing cap may also extend circumferentially around an outer surface of at least a section of said second component.

In some of the examples described herein the thrust bearing seal may have a T-shaped cross section and said projection may comprise the post of the T shape and said external sealing cap may be ring-shaped and comprise the horizontal section of the upper part of the T shape.

In some of the examples described herein, the external sealing cap may be configured so as to provide a radially inward force against the first and second components in use and may be configured to provide a circumferential sealing contact with said first and second components.

In some of the examples described herein the ring-shaped external sealing cap (i.e. the part which comprises the upper, horizontal part of the T-shape) may have a non-uniform cross sectional thickness.

In some of the examples described herein the cross sectional thickness of the external sealing cap may be reduced at the junction either side of the inwardly extending projection in comparison to at least a section of the external sealing cap.

In some of the examples described herein the thrust bearing seal may further be provided with a clamp spring which may be provided on the external surface of the external sealing cap.

In some of the examples described herein the inwardly extending projection may further comprise means that is configured to axially seal said second component and said gap.

In some of the examples described herein, the inwardly extending projection may further comprise a section that is configured to provide an axial force against the second, or fixed component in use.

In some of the examples described herein the section that is configured to provide said axial force may comprise an axially extending circumferential lip that extends from the radially innermost point of the inwardly protruding section.

In some of the examples described herein said circumferential lip may be ring shaped and configured to provide a circumferential and axial force against the second component.

In some of the examples described herein, at the junction between the external sealing cap and the radially inwardly extending projection, on the internal surface of the cap, the cap may have a reduced cross sectional thickness in comparison to the adjacent section of the cap that extends over the first component.

In some of the examples described herein the cross sectional thickness at the junction between the inwardly extending projection and the lip may be reduced in thickness in comparison to the adjacent section of the projection and/or the lip.

In some of the examples described herein the first component and the second component are components of a rotary geared actuator. In some examples the first component may be a rotating component and the second component may be a fixed component.

DETAILED DESCRIPTION

Figure 1A:
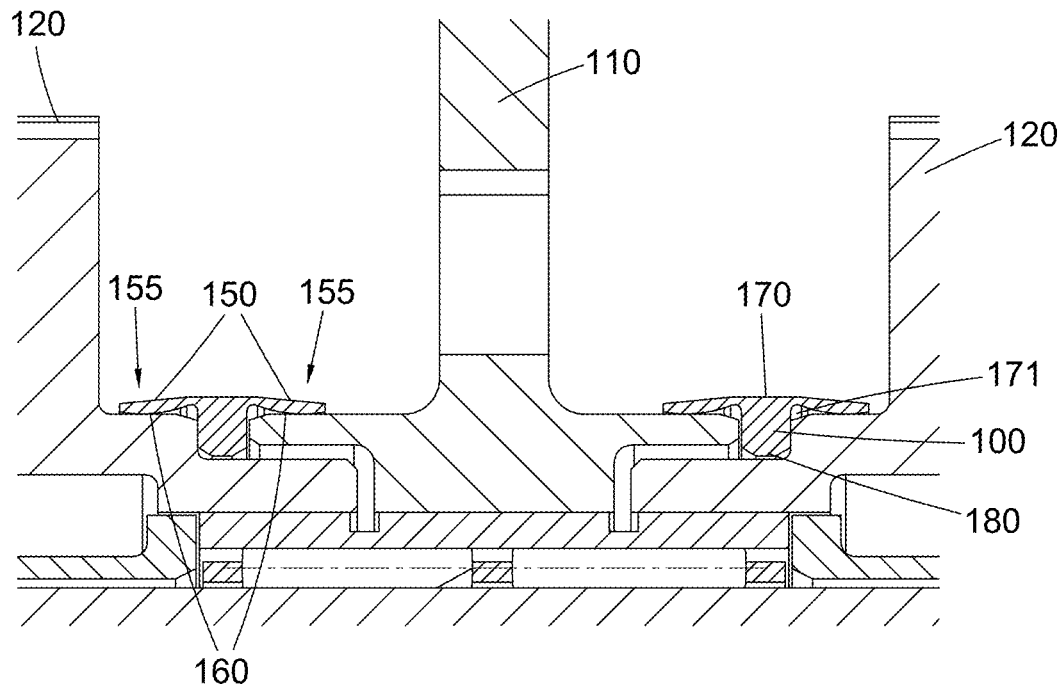
FIG. 1A shows a cross-sectional view of an RGA which depicts a new type of thrust bearing seal.

A new type of thrust bearing seal 100 (two of which are shown in FIG. 1A) that may be used in an RGA (or other mechanical equipment that may need such a seal) is described herein with reference to FIG. 1A. The seal 100 may be used to seal a gap between a first and/or second component of the RGA or other mechanical device. As can be seen in the example shown in FIG. 1A, the RGA may comprise an output, or rotating arm 110, as well as an earth arm or arms 120, which remains fixed in place during use. A gap is provided between the rotating components of the rotating arm 110 and the fixed components of the fixed arm 120. In use, the thrust bearing seal 100 is provided to have at least a section 180 that extends radially inwardly into this gap. This radially inwardly extending section 180 aids in sealing the gap and prevents axial rubbing between the fixed and rotating components of the arms.

In this particular example, the thrust bearing seal 100 provides a circumferential seal between the external circumferential surface of the first, or rotating component 110 and the external circumferential surface of the adjacent second, or fixed component 120. As can be seen in FIG. 1A, these external surfaces of the components are axially aligned with each other, and the seal 100 extends over these surfaces so that the section that covers the external surface of the first component has substantially the same length as the section that covers the adjacent component. In other examples, however, the seal could be designed such that one side, either the fixed, or the rotating side, could have a different diameter to the other.

This seal therefore acts to provide a circumferential and radial sealing of the gap between the components 110, 120 and will now be described in detail.

The seal 100 may, in some examples, be made from PTFE, or bronze type materials. Other materials may also be used.

Figure 1B:
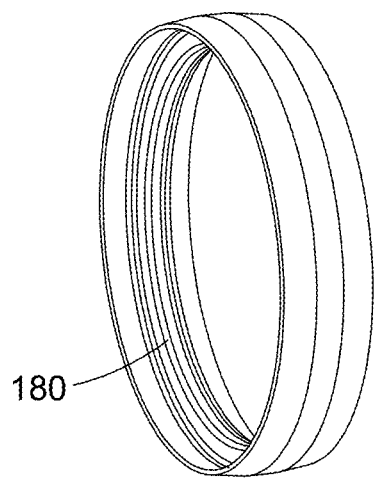
FIG. 1B shows a perspective view of the thrust bearing seal of FIG. 1A.

The thrust bearing seal 100 of this example is ring-shaped, i.e. it has a substantially ring shaped external surface, as shown in FIG. 1B. FIG. 1B depicts a perspective view of the ring-shaped thrust bearing seal 100, whereas in FIG. 1A the cross-section of the seal 100 and other components is shown. Due to the fact that the seal is ring-shaped, in use, at least a section 150 of it extends around a section of the outer circumferential surface of the first component 110, and in this example, also the adjacent second component 120.

Figure 4:
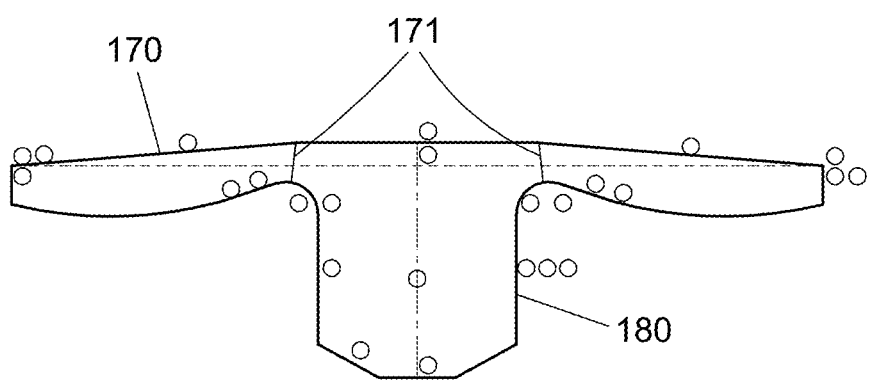
FIG. 4 shows a cross-section view of the thrust bearing seal of FIGS. 1A, 1B and 2.

This circumferential seal 100 is configured so as to provide a radially inward force 155 against the components 110 and 120, and also to provide a circumferential sealing contact 160 with both components 110, 120. This may be achieved in some examples by providing the ring-shaped seal 100 so that it has a T-shaped cross section as shown in FIGS. 1A and 4. In the example shown in FIG. 1A, the T-shape is formed by providing a radially inwardly extending section 180 (which forms the post of the T-shape). This inwardly extending section 180 is positioned in use so as to extend into the gap between the components as shown in FIG. 1. Due to this, the section 180 provides an axial rubbing thrust surface between the rotating and fixed arms.

The upper, horizontal, part of the T-shape may be referred to as an external sealing cap 170. This external sealing cap 170 extends circumferentially around the first and second components, so as to cover the outer surface of the rotating component 110 and the fixed component 120 as shown in FIG. 1 to thereby seal the gap between the components 110, 120 and to seal the gap between the internal gearbox and the external environment. In use, the radially inwardly extending section 180 is positioned so as to extend inwardly into the gap between the two components 110, 120, being sealed as shown in FIG. 1.

In some examples, the external sealing cap 170 may be modified so that it has a non-uniform cross-sectional thickness across the horizontal portion, or top section of the T shape. Typical cross-sections of seals of this kind may be in the range of around 0.5 mm thickness, with a ring circumference of approximately 50 mm diameter. Other sizes and dimensions may also be used.

As shown in FIGS. 1A and 4, this can be achieved by reducing the thickness 171 of the external sealing cap 170 either side of the inwardly extending section 180 as shown in FIGS. 1A and 4. By providing this non-uniform thickness and in particular, a reduced thickness 171 at this junction or region of the sealing ring 100, the external sealing cap 170 is able to act as a spring on both sides of the projection 180 as it is configured to elastically flex for both installation and operation. It is also able to exert a constant pressure and contact (spring effect) with the mating shaft surface.

Figure 2:
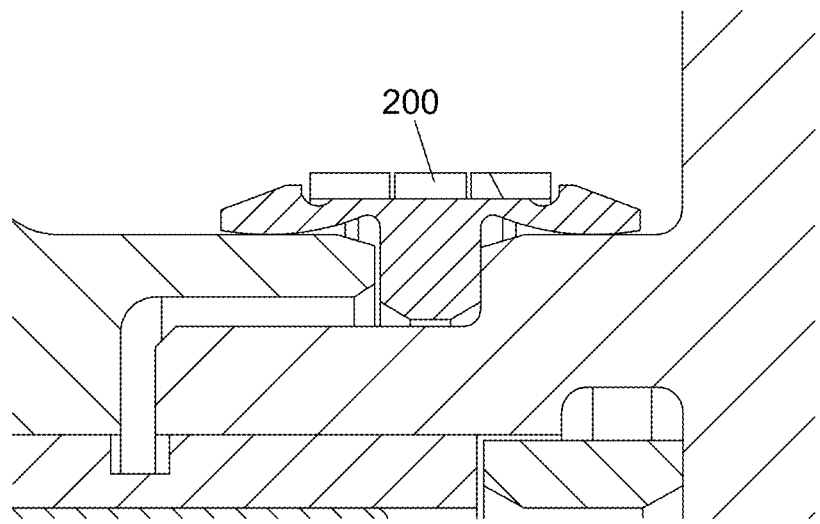
FIG. 2 shows an example of the thrust bearing seal of FIGS. 1A and 1B, with an (optional) external clamp ring also provided.

Another example of a new type of thrust bearing seal is depicted in FIG. 2. In this example, the seal 100 corresponds to that shown in FIGS. 1A and 1B but further comprises the additional feature of a clamp spring 200 that is provided on the external surface of the external sealing cap 170 of the thrust bearing seal 100 to cope with additional tolerance and runout variations and/or more extreme environmental conditions. The clamp spring 200 provides additional seal spring contact force to the seal 100, ensuring that the seal remains in permanent contact with both sealing surfaces of the rotating and fixed arms. In this example, the external surface of the seal 100 may have a modified shape so as to better fit with and accommodate the spring 200.

Figure 3:
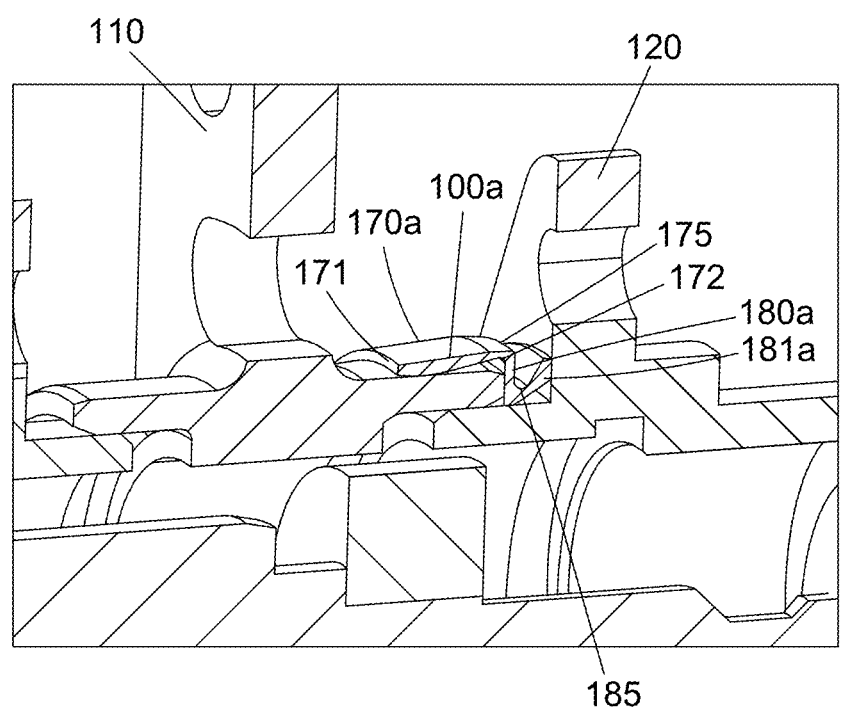
FIG. 3 shows another example of a new type of thrust bearing seal that is configured to be able to provide a circumferential seal both radially and axially.

Another example of a new type of thrust bearing seal 100a is depicted in FIG. 3, which provides both radial and axial sealing. As can be seen in this figure, the RGA again has an output arm 110 that has rotating components as well as an earth arm 120 that is fixed. There is a gap between these components 110, 120 and the seal 100a is positioned so as to have a radially inwardly extending section 180a (much in the same way as for the example of FIG. 1A) that extends into this gap and thereby seals the gap between the fixed and rotating components as shown in FIG. 3.

In contrast to the RGA of FIG. 1, the seal in this example must not only provide radial sealing but must also be configured to provide axial sealing. In the same was as described with reference to FIG. 1, the radial sealing is achieved by this seal 100a by providing an external cap section 170a that extends axially in the direction of the second component 120 and extends around a section of the outer circumferential surface of one of the components 110. The internally radially protruding section 180a is again provided to extend longitudinally into the gap, in a similar manner to the section 180 of FIG. 1. In this way, radial sealing is achieved between the gap and the rotating component 110.

Axial sealing of the gap and the fixed component 120 is achieved by providing a section of the seal 100a that is configured to provide an axial force against the second, or fixed component 120.

This is achieved by providing an external sealing cap 170a that has a substantially ring shaped external surface which in use extends over a section of the outer surface of the first component 110 in much the same way as the example of FIG. 1A. The external sealing cap 170a has a width that extends from a first end 171 closest to the first component 110 to a second end 172 which is positioned over the gap between the components 110, 120 in use. At the end of the external sealing cap 170a, which is positioned over the gap and closest to the second component 120 in use, the seal 100a comprises a radially inwardly protruding section 180a extending perpendicularly inward from the external sealing cap 170a and radially inwardly into the gap (in much the same way as for the example of FIG. 1A). At the radially innermost point 185 of the inwardly protruding section 180a, an axially extending circumferential lip 181a is also provided. This lip 181a is also ring shaped and provides a circumferential and axial force against the second component 120.

The seal 100a has a cross-section as shown in FIG. 3. In the same way as for the example shown in FIG. 1A, at the junction 175 between the external sealing cap 170a and the inwardly extending projection 180a, on the internal surface of the cap 170a, the cross section thickness of the cap 170a may be reduced in comparison to the adjacent section of the cap 170a that extends over the first component. This reduction in cross section at this point allows the cap 170a to spring radially. Similarly, at the junction between the inwardly extending projection 180a and the lip 181a, the cross section of the seal may be reduced in thickness in comparison to the adjacent section of the projection 180a and/or the lip 181a. This reduction in cross section at this point allows the cap 170a to spring radially.

The thrust bearing seals described herein provide many benefits over known seals and able to form an efficient and effective space saving solution for an RGA.

These benefits include the fact that they provide a reduced RGA envelope and reduced aircraft wing section, thereby leading to huge benefits for both the system and aircraft performance. The seals also provide a reduced system weight as this allows for shorter length and smaller diameter RGAs. This reduction in aircraft weight allows also for the wing section to be made thinner and more aerodynamic. The examples could also be used in any thin wing application, thereby providing key weight, efficiency and performance benefits. A reduced aircraft weight is also provided as this allows for a thinner and more aerodynamic wing section. The seals result in a reduced cost as they combine a thrust bearing ring with a seal to provide a low cost economical solution. The seals provide a reduced part count, as a reduced number of RGA seals are needed. They provide increased reliability as there are fewer parts and do not require the installation and removal of internal blind fitted elastomer seals. Unit assembly complexity is also reduced. The seals provide improvements in the ease of maintenance as well as assembly and dis-assembly. The seals can also be used in multiple applications and are not limited to use in RGAs. This combined thrust bearing and sealing solution could be applied to many applications. This solution could also provide a step change in the benefits as described above.

The examples described herein are discussed in relation to their use in an RGA for an aircraft wing, however, they are not limited to this use, and could be used in any device or mechanism that requires the use of a seal.

The invention claimed is:

1. A thrust bearing seal for radially sealing a gap between a first component and a second component, the seal comprising:
   an external sealing cap that extends circumferentially around an outer circumferential surface of at least a section of said first component; and
   a projection that extends radially inwardly from said external sealing cap and into said gap, wherein said projection further comprises means configured to axially seal said second component and said gap;
   wherein said means are configured to axially seal to provide an axial force against the second, or fixed component in use and also comprises:
   an axially extending circumferential lip that extends from the radially innermost point of the inwardly protruding section.

2. The seal of claim 1, wherein said external sealing cap also extends circumferentially around an outer surface of at least a section of said second component.

3. The seal of claim 2, wherein:
   said seal has a T-shaped cross section having a post and an upper part; and
   said projection comprises the post of the T shape and said external sealing cap is ring-shaped and comprises the upper part of the T shape.

4. The seal of claim 2, wherein said external sealing cap is configured so as to provide a radially inward force against the components, and a circumferential sealing contact with said first and second components.

5. The seal of any of claim 4, claim wherein said external sealing cap has a non-uniform cross-sectional thickness.

6. The seal of claim 5, wherein the non-uniform cross-sectional thickness of the external sealing cap is reduced at a junction either side of the inwardly extending section of the external sealing cap and the projection.

7. The seal of claim 1, further comprising:
   a clamp spring provided on the external surface of the external sealing cap of the thrust bearing seal.

8. The seal of claim 1, wherein said circumferential lip is ring shaped and configured to provide a circumferential and axial force against the second component.

9. The seal of claim 1, wherein at a junction between the external sealing cap and the inwardly extending projection, on an internal surface of the cap, the cross section thickness of the cap has a reduced cross sectional thickness in comparison to an adjacent section of the cap that extends over the first component.

10. The seal of claim 1, wherein a cross sectional thickness at the junction between the inwardly extending projection and the lip is reduced in thickness in comparison to the adjacent section of the projection or the lip.

11. The seal of claim 1, wherein the first component and the second component are components of a rotary geared actuator.

12. The seal of claim 1, wherein the first component is a rotating component and said second component is a fixed component.

* * * * *